Nov. 9, 1965
G. C. SUMMERS
3,216,524
SINGLE CONDUCTOR ACOUSTIC WELL LOGGING SYSTEM
Filed March 1, 1962
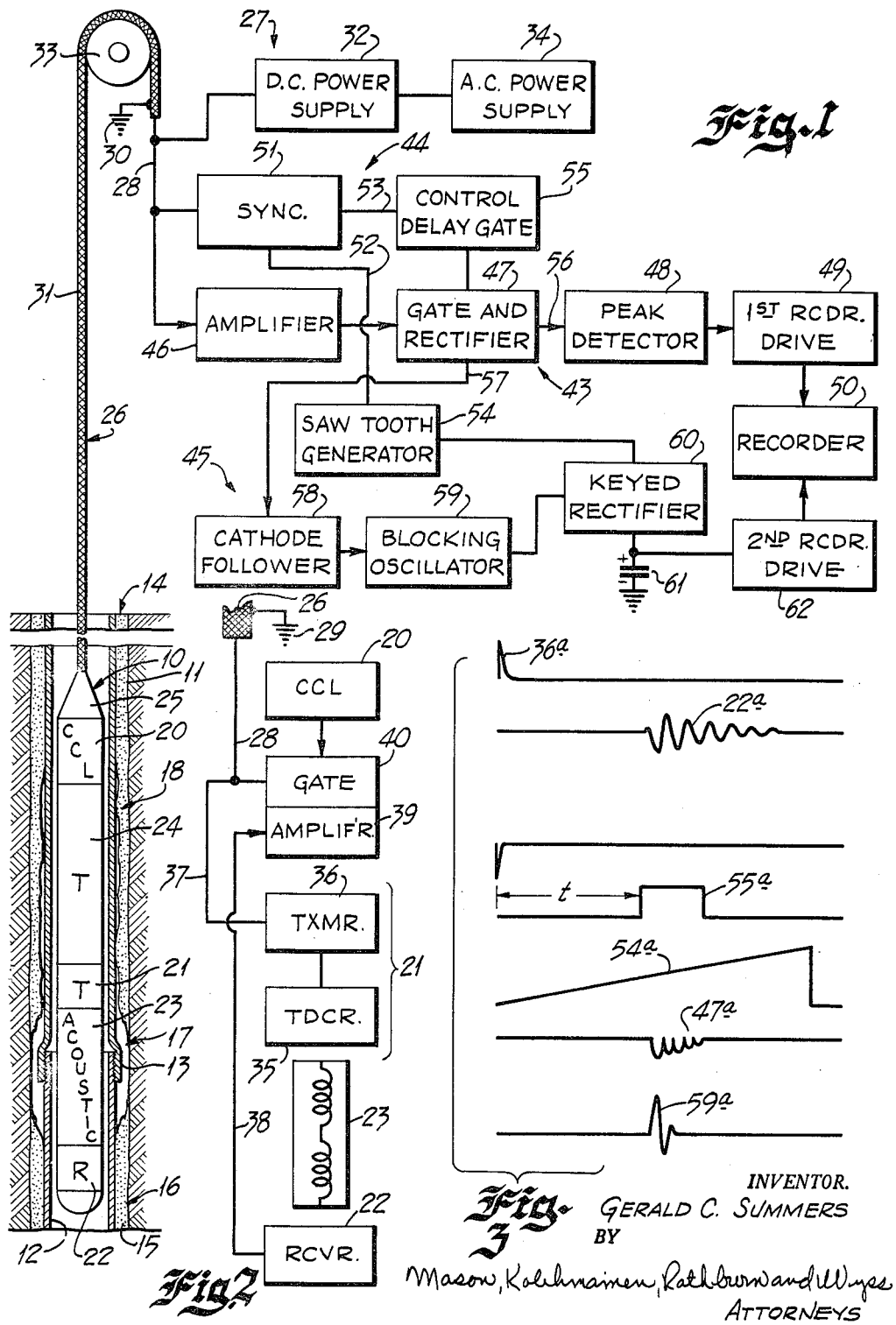
INVENTOR.
GERALD C. SUMMERS
BY
Mason, Kolehmainen, Rathburn and Wyss
ATTORNEYS

United States Patent Office 3,216,524
Patented Nov. 9, 1965

3,216,524
SINGLE CONDUCTOR ACOUSTIC WELL LOGGING SYSTEM
Gerald C. Summers, Dallas, Tex., assignor, by mesne assignments, to PGAC Development Company, Houston, Tex., a corporation of Texas
Filed Mar. 1, 1962, Ser. No. 176,752
7 Claims. (Cl. 181—.5)

The present invention relates generally to acoustic well logging and is more particularly concerned with a new and improved system for determining the quality of the cement bond between the casing and the walls of a borehole.

In the production of water-free hydrocarbons such as gas or oil from a well, it is common practice to insert cement into the spacing between the casing and the borehole walls, thus producing a squeeze effect at the level of the well where the hydrocarbons are being extracted. Frequently, the cement does not fill the entire space between the casing and the borehole walls due to failure to bond either with the earth formations or with the outer surface of the casing. It is important to be able to log the cased well to determine the quality of the cement bond at the different borehole depths of interest. One such system for accomplishing this result is disclosed and claimed in copending application Serial No. 181,859 filed by the present inventor simultaneously with the present application and assigned to the same assignee as the present invention.

The present invention is directed to a new and improved system for determining the quality of the cement bond while utilizing a cable having only a single inner conductor extending between the downhole tool and the surface measuring equipment. As is well known in logging operations, it is desirable to employ a cable having a minimum number of inner conductors for several reasons, first, because the cost of the cable, which is one of the highest cost items of the system, is materially reduced and, second, because the use of a multiple conductor cable increases the size and weight thus complicating the cable storage and reeling facilities and also introducing problems with respect to cable stretch. The amount of cable stretch is usually very difficult to determine and, as a result, it may cause inaccuracies in the log since the borehole depths indicated on the final record may differ from the actual location of the downhole tool within the borehole. For all of these reasons, it would be desirable to provide a system using only a single conductor cable.

As is explained in the above-identified copending application, it has been found that the attenuation of acoustic energy in passing from a transmitter to a spaced receiver is a very useful parameter in measuring the quality of the cement bond. Thus, in areas of the borehole where there is little or no cement or where the bond to the casing is very poor, the acoustic energy travels almost exclusively through the casing since the absence or poor quality of the bond prevents any appreciable refraction of the acoustic energy into the borehole formations with the result that it arrives at the receiver at a very high amplitude. On the other hand, when the cement bond is very good most of the acoustic energy is refracted through the earth formations and very little passes through the casing. Thus, a measurement of the amplitude of the energy reaching the receiver through the casing provides an indication of the quality of the cement bond. However, in some cases, particularly in logging high velocity layers such as limestone or dolomite, the energy travelling through the earth formations arrives at the receiver prior to the somewhat more slowly travelling energy passing through the casing. Thus, if a measurement is made of the amplitude of the signal initially arriving at the receiver, such a measurement, standing alone, cannot provide a determination of the cement bond quality because it is impossible to determine whether the casing signal or the formation signal is arriving first. However, if a velocity measurement is made simultaneously with the amplitude measurement to indicate the shortest travel time of the acoustic energy from the transmitter to the receiver irrespective of the path transversed, those areas where the formation signal arrives prior to the casing signal can be readily determined and this information can be used in analyzing the amplitude or attenuation log. The present invention, therefore, has for a principal object the provision of a new and improved well logging system for producing simultaneously an amplitude or attenuation curve and a velocity or travel time curve while, at the same time, utilizing only a single conductor cable extending between the downhole tool and the surface equipment.

Another object of the invention is to provide a new and improved single conductor, well logging system of the character described wherein a velocity curve is produced in response to signals arriving at a single receiver from a transmitter and, at the same time, a curve is made of the amplitude of these arriving signals as a function of borehole depth.

A further object of the invention is to provide a well logging system for simultaneously producing a velocity curve and an amplitude curve but which is, at the same time, characterized by simple, relatively inexpensive construction.

It is also an object of the invention to provide a new and improved single conductor, well logging system for providing a casing collar indication simultaneously with the amplitude and velocity curves described above.

The foregoing and other objects are realized, according to the present invention, by providing a well logging system employing a downhole tool carrying both a transmitter of succesive spaced apart acoustic pulses and a receiver spaced a fixed distance from the transmitter in a direction extending longitudinally of the borehole. The output of the receiver is applied through an amplifier in the downhole tool and via a single conductor cable to measuring and recording apparatus at the surface. A casing collar locator section is also included in the downhole tool and preferably includes a conventional magnetic casing collar detector for developing D.C. signals which are supplied to the amplifier in the downhole tool so that when a casing collar is disposed adjacent the collar locator the D.C. signals cause the amplifier to develop a characteristic casing collar indicating output. For example, the D.C. signals may be effective to drive the amplifier into oscillation when the collar locator encounters a casing collar.

The output of the amplifier including the casing collar signals and electrical signals corresponding to the detected acoustic pulses received from the transmitter is passed over the single conductor to the surface equipment together with synchronizing signals developed coincident with the transmitter pulses. Direct current power for the electronic circuits of the downhole tool is supplied from the surface via the single conductor cable. In the surface equipment, the signals transmitted from the downhole tool over the single conductor cable are used to develop simultaneously a velocity or travel time curve and an amplitude or attenuation curve and, at the same time, the casing collar signals are used to provide indications on the velocity and amplitude curves.

The invention, both as to its organization and manner of operation, together with further objects and advantages, will best be understood by reference to the following description taken in conjunction with the accompanying drawing wherein:

FIG. 1 is a partially schematic, partially diagrammatic view of a well logging system characterized by the features of the present invention with the downhole tool of the system being illustrated within a section of a cased borehole extending into the earth;

FIG. 2 is a schematic diagram showing the circuits employed in the downhole tool used in the system shown in FIG. 1; and FIG. 3 shows a group of typical waveforms which are useful in explaining the operation of the system shown in FIG. 1.

Referring now to the drawing and first to FIG. 1, a well logging system embodying the principles of the present invention is there shown as including a downhole tool 10 disposed within a borehole 11 extending into the earth from the surface. The borehole 11 has been cased by a plurality of casing sections 12 secured together in end to end relationship as, for example, by threading one end of each section into a collar 13 formed on the adjacent section. The casing is usually formed of steel and obviously a double thickness of such material exists at each of the casing joints or collars 13.

As was previously indicated, it is often desirable in the production of hydrocarbons to pour cement into the generally annular space 14 existing between the casing sections 12 and the walls of the borehole 11, this cement being identified by the reference numeral 15 in FIG. 1. As is shown in the drawing, the cement 15 does not always bond firmly to the outer periphery of the casing sections 12 or to the borehole walls and, as a result, there may exist at different borehole depths areas such as that shown at 16 where the bonding is very good, areas such as that shown at 17 where there is little or no cement and other areas such as that shown at 18 where the cement bond is of intermediate quality.

The well logging system of the present invention is adapted to provide information useful in indicating the quality of the cement bond at the different borehole depths and, to this end, it produces simultaneously an amplitude or attenuation curve, a velocity or travel time curve and a casing collar curve for indicating the borehole depths at which the collars 13 are located. To provide these three curves the downhole tool 10 includes a casing collar detecting section 20, a transmitting transducer or transmitter section 21, a receiving transducer or receiver section 22, an acoustic isolating section 23 which spaces and electrically insulates the sections 21 and 22, and a transceiver or electronic section 24 containing the electronic components of the downhole tool described more fully hereinafter. The sections of the downhole tool are housed within generally cylindrical casings provided with threaded couplings (not shown) at both ends to facilitate securing them together end to end in well known manner. Suitable electrical connectors are provided between the different sections but these are conventional and, hence, are not shown in the drawing. The uppermost section 20 is secured to a cable head 25 which is, in turn, connected to the lower end of a cable 26 extending through the borehole and connected at the earth's surface to surface equipment indicated generally by the reference numeral 27. In accordance with the present invention, the cable 26 provides the necessary electrical circuit connections between the downhole tool 10 and the surface equipment 27 while utilizing a single inner or central conductor 28 housed within an outer conducting sheath 31. The outer sheath is grounded at 29 in the downhole tool 10 and at 30 in the surface equipment to provide a common ground connection. At the surface the cable 26 is trained over a sheave 33 which is mortor driven and which cooperates with the cable to form a means to raise or lower the tool 10 within the borehole.

Power for the electrical circuits of the downhole tool 10 is supplied from a conventional D.C. power source 32 and its associated A.C. power supply 34 in the surface equipment. The D.C. output of the power supply 32 is applied between the conductor 28 and the grounded outer sheath 31 so that in the downhole tool this power can be used as the B+ supply for the various electronic circuits.

As is shown in FIG. 2, the transmitting section 21 includes a transmitting transducer 35 and a free-running high-power pulse source 36 of the type described in U.S. Patent No. 2,737,639. The pulse source 36 is excited by the D.C. power supplied from the source 32 and causes the transmitting transducer 35 to emit acoustic pulses at a suitable repetititon rate, for example, at a rate of about 15 to 30 pulses per second. In the ensuing description, a repetition rate of 20 pulses per second will be assumed thus providing a period of 50 milliseconds between successive pulses. While the receiver 22 may be spaced from the transmitter 21 any suitable distance, preferably provision is made for a spacing of 4, 5, 6, 7, or 8 feet by insertion of an acoustic section 23 of proper length. In any event, the spacing is such that all of the energy necessary for the production of the velocity and amplitude curves will arrive at the receiver 22 within a few milliseconds following the coustic pulse and, hence, the velocity and amplitude measurements are made during this short interval which may be referred to as the measuring interval. In the waveforms shown in FIG. 3, only the events occurring during the measuring interval have been depicted since the remaining portions of each 50 millisecond period are insignificant. The transmitting transducer 35 and its associated pulse source 36 comprise means for generating a series of spaced apart acoustic or elastic pulses coupled by the borehole fluid to the casing section 12 and from the casing sections through the cement 15 to the earth formations surrounding the borehole. As is described in copending application Serial No. 846,974 filed October 16, 1959 and assigned to the same assignee as the present invention, a small portion of each pulse from the transmitting transducer is used to develop a synchronizing pulse which appears upon a lead 37 connected to the conductor 28. The synchronizing pulse is represented by the waveform 36a in FIG. 3 and is used to control the timing of the surface equipment 27 in a manner described in detail in the ensuing description.

The receiver section includes a receiving transducer of conventional construction for converting the received acoustic or elastic energy into corresponding electrical signals which are passed via a conductor 38 to an amplifier 39. The signals detected by the receiver are represented in FIG. 3 by the waveform 22a. The output signals from the amplifier 39 are passed through a gate circuit 40 to the cable conductor 28 for transmission to the surface equipment.

The casing collar locating section 20 is preferably of the conventional magnetic type utilizing a pair of detecting coils normally balanced. When the downhole tool 10 is moved along the borehole, the coils will become unbalanced as they approach a casing collar 13 due to the effect of the increased thickness of the casing upon the magnetic fields. This unbalance creates a control signal which is applied to the gate 40 in order to cause the output of the amplifier 39 to vary in a characteristic manner indicative of the presence of the collar. Preferably, the gate 40 comprises a monostable or one-shot multivibrator of the type shown in U.S. Patent No. Re. 24,446 and is effective to create a square wave or D.C. signal which is applied to the amplifier 39 to drive the latter into oscillation at a frequency which will appear upon the amplifier output applied to the conductor 28. This oscillation will affect the velocity and amplitude curves in a manner described more fully below so that the collar locations can be determined. If the downhole tool is moved through the borehole at constant speed, collars 13 will be encountered at uniform intervals since the casing sections 12 are of equal length.

The synchronizing pulses 36a and the output 22a of the receiver 22 appearing on the conductor 28 are applied in the surface equipment 27 to an amplitude measuring channel 43, a timing channel 44, and a velocity measuring channel 45. The channel 43 provides tthe amplitude measurement and the channel 45 provides the velocity or travel time measurement. The channel 44 functions to gate both the amplitude measuring channel 43 and the velocity measuring channel 45 so that these channels are not triggered by spurious noises or the like, and hence, respond only to signals arriving at the receiver 22 from the transmitter 21. More specifically, the amplitude measuring channel 43 comprises an amplifier 46 for amplifying the signals detected by the receiver 22 and for passing these signals to a gater rectifier circuit 47. The circuit 47 includes a gate of the type shown in U.S. Patent No. 2,862,104 which is rendered conductive for a predetermined gate period to supply signals to a conventional rectifier, thereby to develop full wave rectifier signals 47a. The latter signals are supplied to a conventional peak riding detector 48 which provides a D.C. output proportional to the peak amplitude of the input signal 47a supplied during the gate period. The peak riding detector 48 may be of the type disclosed on page 4–65 and 4–66 of the book entitled "Principles of Radar" published by McGraw-Hill Book Company Inc. in 1946. The D.C. output from the peak riding detector 48 is applied to a first recorder drive 49 of a conventional recorder 50. The latter recorder may include a plurality of recording galvanometers one of which is controlled by the drive 49 to deflect a light beam impinging upon a sensitized recording medium driven past the beam in synchronism with the sheave 33. The deflection of the beam is, of course, proportional to the D.C. voltage from the detector 48 and, as a result, the recorder develops a first continuous curve representing the peak amplitude of the pulses 47a. In the alternative, the drive 49 may control a recording pen or stylus acting upon a recording medium. In either case, the curve developed by the recorder drive 49 is a conventional amplitude curve and the record may, if desired, be calibrated in terms of attenuation in view of the fact that the amplitude of the detected signal is inversely proportional to the attenuation introduced by the earth formations or by the casing.

Turning next to the timing channel 44, it will be observed that this channel comprises a sync amplifier 51 for amplifying the synchronizing pulses 36a to provide an output trigger or spike 51a appearing upon an output lead 52 and also upon a conductor 53. The output lead 52 is connected to a timing signal or sawtooth generator 54 for developing a gradually changing or monotonically varying output signal 54a. Preferably, the generator 54 is a conventional bootstrap sawtooth generator of the type shown in U.S. Patent No. Re. 24,446 for producing a sawtooth wave having its initial rise beginning with the synchronizing pulse 36a and continuing to rise linearly for a predetermined duration which is somewhat greater than the time required for the acoustic pulse to travel from the transmitter 21 to the receiver 22. The duration of the sawtooth is, of course, only a small fraction of the total time period between successive transmitter pulses.

The timing channel 44 further includes a control delay gate circuit 55 for developing a square wave output 55a to control the conduction of the gate and rectifier circuit 47 in the channel 43. The input of the circuit 55 includes a delay circuit of the type identified by the reference numeral 25 in U.S. Patent No. 2,768,701 for delaying the start of the gating signal 55a for a fixed period t, following the synchronizing pulse 36a. The delay period, t, is somewhat less than the time required for the acoustic pulse to pass from the transmitter 21 through the casing sections 12 to the receiver 22. The gate circuit 55 preferably comprises a monostable multivibrator of the type shown in U.S. Patent No. Re. 24,446 which is triggered by the delayed synchronizing pulse appearing on the conductor 53. The duration of the gate signal 55a may be varied by adjusting the resistors or capacitors of the multivibrator circuit in well known manner but preferably this gate signal covers an interval of 65 to 265 microseconds. The velocity of the signals travelling through the casing is, of course, constant and, as a result, these signals arrive at the receiver 22 some time time near the middle of the gating signal 55a. The gate and rectifier circuit 47 is non-conductive until it receives the square wave gating signal 55a and, hence, both during the delay period, t, and after the termination of the gating signal, no signals are passed to its output leads 56 and 57. This prevents both the velocity channel 45 and the amplitude channel 43 from responding to noises or other signals which do not fall within the gating interval. Signals detected by the downhole receiver 22 during the period of the gating signal 55a are passed to the signal gate and rectifier 47 which acts to develop at its output leads signals of only one polarity, for example, negative going signals 47a as shown in FIG. 3. The signals on the output lead 56 from the circuit 47 are passed to the peak detector 48 which functions as indicated above to develop a D.C. pulse having an amplitude proportional to the peak amplitude of the pulses 47a. Those signals appearing on the conductor 57 are passed through a conventional cathode follower 58 to a blocking oscillator 59 of the type described in MIT Radiation Laboratory Series, Volume 19, Waveforms, McGraw-Hill, 1949, Page 218, Fig. 6.7. The blocking oscillator 59 produces a sharp trigger pulse 59a to excite a keyed rectifier circuit 60 which is also supplied with the linear sawtooth wave 54a from the generator 54. The keyed rectifier 60 may be identical to the switch circuit identified by the reference numeral 32 in U.S. Patent No. Re. 24,446, and is effective to control the charging and discharging of a storage capacitor 61 connected across its output. As will be evident from an understanding of the latter patent, the blocking oscillator 59 triggers the keyed rectifier circuit 60 to charge the capacitor 61 to a level corresponding to the amplitude of the sawtooth wave 54a at a time corresponding to the instant of first arrival of the acoustic pulse from the transmitter 21 at the receiver 22. The blocking oscillator 59 will be triggered either by the casing signals arriving at the receiver or by signals travelling through the earth formation and arriving at the receiver either just prior to or just subsequent to the casing signals. During the next succeeding cycle or period, if the first arrival at the receiver 22 occurs earlier than the previous one, thus indicating a higher velocity of propagation, the sawtooth 54a will have reached a lower level at the time when the blocking oscillator 59 is triggered so that the capacitor 61 discharges to a somewhat lower level. Conversely, if the first energy arriving at the receiver during the next cycle is later than the previous one the charge on the capacitor 61 is increased to a higher level. Thus, the voltage across the capacitor is proportional to the time expiring between the transmission of a pulse from the transmitter 21 and the arrival of the first portion of the resulting energy at the receiver 22. This voltage is applied to a second recorder drive or additional recording means 62 of the recorder 50 to develop a conventional single receiver, continuous curve representing as a function of borehole depth the velocities of propagation of the different formations disposed between the transmitter 21 and the receiver 22 as the tool 10 is moved within the borehole 11. At borehole depths where the formation velocities are high, the earth formation signals arrive at the receiver 22 ahead of the casing signals thus providing a high velocity indication on the velocity curve assuming, of course, that the formation signals are of sufficient amplitude level to trigger the blocking oscillator 59. If the amplitude of the casing signals is below the latter level, thus indicating a good cement bond, the subsequently arriving signals will provide a low velocity indication, that is, a velocity lower than that of the casing. Both the velocity curve and the amplitude curve are developed simultaneously and appear side by side on the record produced by the recorder 50.

When the downhole tool is disposed adjacent a collar 13, the casing collar signals developed by the locator 20 are effective to drive the downhole amplifier 39 into oscillation thus producing very high amplitude signals at the output of the gate and rectifier circuit 47. The amplitude curve developed by the recorder drive 50 thus produces a high amplitude indication. At the same time, since the oscillations of the amplifier 39 appear throughout the duration of the gating signal 55a, the blocking oscillator 59 will be triggered as soon as the gate circuit 47 is opened, the velocity curve developed by the recorder drive 62 will show a high velocity in excess of that of the signals travelling through the casing. The variations in the two curves caused by the casing collars will, of course, be spaced uniformly along the record when the downhole tool is moved at constant speed and, as a result, the casing collar locations can be readily determined.

The operation of the system described above to produce the amplitude and velocity curves and the casing collar indications as the downhole tool 10 is moved through a predetermined length of the borehole 11 by driving the sheave 33 is believed to be obvious in view of the foregoing description. Since the log produced by the system described is similar to that developed by the arrangement disclosed in the copending application Serial No. 181,859 described above, except, of course, for the different manner of presenting the casing collar information, the analysis of this record to determine the quality of the cement bond will be obvious in view of the detailed description of the record analysis procedure set forth in the latter application. In those areas of the record where the amplitude curve shows a very low attenuation while the velocity curve shows a velocity coinciding with the velocity of propagation of the acoustic energy through the steel casing sections or a lower velocity, a poor cement bond is indicated. In areas where the velocity curve shows a velocity of propagation higher than that of the steel casing as might be caused, for example, when the earth formation signals pass through limestone or dolomite formations which transmit the acoustic energy at a high energy level, the analyst knows that the amplitude curve does not show the attenuation of the casing and, hence, the information in these areas is suspect and must be interpreted more thoroughly. The amplitude curve alone may not provide completely reliable results and may lead to unnecessary squeeze jobs or cement bonds in areas where the bond is already adequate. However, the simultaneous recording of both the amplitude and single receiver velocity curves minimizes the confusion by providing more reliable information to improve the cement techniques, thus reducing the total bonding cost.

While the invention has been described in conjunction with an illustrative embodiment, it will be understood that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In a system for logging a cased borehole extending into the earth's formations and having cement interposed between the exterior of the casing and the walls of the borehole the combination of a downhole tool within the borehole; a cable having a single inner conductor within an outer sheath and extending from the downhole tool through the borehole to the earth's surface, means at the surface cooperating with the cable to raise and lower the downhole tool within the borehole; and equipment at the surface connected to said cable; said downhole tool comprising a casing collar locator for providing collar locating signals having at least one characteristic affected by the casing collars, a transmitter for repeatedly emitting spaced apart acoustic pulses for transmission through the casing and through the earth formations coupled to the casing via said cement and for producing a synchronizing pulse coincident with each acoustic pulse, a receiver spaced from the transmitter in a direction extending longitudinally of the borehole for receiving said acoustic pulses and for developing corresponding electrical signals, means for transmitting to said surface equipment over said single conductor said collar locating signals, said synchronizing pulses and said electrical signals; said surface equipment including means connected to said inner conductor for separating said collar locating signals, said synchronizing pulses and said electrical signals, recording means including said separating means for developing longitudinally along a recording medium and in response to said synchronizing pulses and said electrical signals a first curve proportional to the travel time of the acoustic pulses from the transmitter to the receiver at the different borehole depths, additional recording means connected to said inner conductor and responsive to said synchronizing pulses and said electrical signals for developing longitudinally along said medium a second curve proportional to the amplitude of the electrical signals at the different borehole depths, said first and second curves being displaced transversely of said recording medium and having a common time base so that transversely aligned points on said curves represent a common borehole depth, whereby the acoustic pulses arriving at said receiver after passing through the casing and having an amplitude represented by said second curve can be readily distinguished on said second curve from the acoustic pulses arriving at said receiver after passing through the cement and the earth formations by the differences in travel time indicated on said first curve, the differences in amplitude of the signals recorded on said second curve being indicative of the relative amounts of energy of said acoustic pulses passing through said casing and through the cement and the earth formations so that high amplitude recordings on said second curve represent borehole depths where a large proportion of the energy of said acoustic pulses reaches said receiver after passing through said casing while relatively lower amplitude recordings on said second curve represent borehole depths where a substantial portion of the energy of said acoustic pulses is coupled from the casing through the cement into the earth formations, said recording means also including means for providing on said medium an indication from which the depths of the casing collars may be determined.

2. The apparatus defined by claim 1 wherein means are provided for superimposing said casing collar signals upon said electrical signals so that the casing collar indications appear on at least one of said first and second curves.

3. In a system for logging a cased borehole extending into the earth's formations and having cement interposed between the exterior of the casing and the walls of the borehole the combination of a downhole tool within the borehole; a cable having a single inner conductor within an outer sheath and extending from the downhole tool through the borehole to the earth's surface; means at the surface cooperating with the cable to raise and lower the downhole tool within the borehole; and equipment at the surface connected to said cable; said downhole tool comprising a transmitter for repeatedly emitting spaced apart acoustic pulses for transmission through the casing and through the earth formations coupled to the casing via said cement and for producing a synchronizing pulse coincident with each acoustic pulse, a receiver spaced from the transmitter in a direction extending longitudinally of the borehole for receiving said acoustic pulses and for developing corresponding electrical signals, means for transmitting to said surface equipment over said single conductor said synchronizing pulses and said electrical signals; said surface equipment including means connected to said inner conductor for separating said synchronizing pulses and said electrical signals, recording means including said separating means and responsive to said synchronizing pulses and said electrical signals for developing longitudinally along a recording medium a first curve proportional to the travel time of the acoustic pulses from the transmitter to the receiver at the different borehole depths, additional recording means connected to said inner conductor and responsive to said synchronizing pulses and said electrical signals for developing longitudinally along said medium a second curve proportional to the amplitude of the electrical signals at the different borehole depths simultaneously with the development of the first curve, said first and second curves being displaced transversely of said recording medium and having a common time base so that transversely aligned points on said curves represent a common borehole depth, whereby the acoustic pulses arriving at said receiver after passing through the casing and having an amplitude represented by said second curve can be readily distinguished on said second curve from the acoustic pulses arriving at said receiver after passing through the cement and the earth formations by the differences in travel time indicated on said first curve, the differences in amplitude of the signals recorded on said second curve being indicative of the relative amounts of energy of said acoustic pulses passing through said casing and through the cement and the earth formations so that high amplitude recordings on said second curve represent borehole depths where a large proportion of the energy of said acoustic pulses reaches said receiver after passing through said casing while relatively lower amplitude recordings on said second curve represent borehole depths where a substantial portion of the energy of said acoustic pulses is coupled from the casing through the cement into the earth formations.

4. In a system for logging a cased borehole extending into the earth's formations and having cement interposed between the exterior of the casing and the walls of the borehole the combination of a downhole tool within the borehole; a cable having a single inner conductor within an outer sheath and extending from the downhole tool through the borehole to the earth's surface; means at the surface cooperating with the cable to raise and lower the downhole tool within the borehole; and equipment at the surface connected to said cable; said downhole tool comprising a casing collar locator for providing collar locating signals having at least one characteristic affected by the casing collars, a transmitter for repeatedly emitting spaced apart acoustic pulses for transmission through the casing and through the earth formations coupled to the casing via said cement and for producing a synchronizing pulse coincident with each acoustic pulse, a receiver spaced from the transmitter in a direction extending longitudinally for the borehole for receiving said acoustic pulses and for developing corresponding electrical signals, means for transmitting to said surface equipment over said single conductor said collar locating signals, said synchronizing pulses and said electrical signals; a D.C. power supply in said surface equipment connected to said single conductor to supply power to the downhole tool; said surface equipment including means connected to said inner conductor for separating said collar locating signals, said synchronizing pulses and said electrical signals, recording means including said separating means and responsive to said synchronizing pulses and said electrical signals for developing longitudinally along a recording medium a first curve proportional to the travel time of the acoustic pulses from the transmitter to the receiver at the different borehole depths, additional recording means connected to said inner coductor and responsive to said synchronizing pulses and said electrical signals for developing longitudinally along said medium a second curve proportional to the amplitude of the electrical signals at the different borehole depths simultaneously with the development of the first curve, said first and second curves being displaced transversely of said recording medium and having a common time base so that transversely aligned points on said curves represent a common borehole depth, whereby the acoustic pulses arriving at said receiver after passing through the casing and having an amplitude represented by said second curve can be readily distinguished on said second curve from the acoustic pulses arriving at said receiver after passing through the cement and the earth formations by the differences in travel time indicated on said first curve, the differences in amplitude of the signals recorded on said second curve being indicative of the relative amounts of energy of said acoustic pulses passing through said casing and through the cement and the earth formations so that high amplitude recordings on said second curve represent borehole depths where a large proportion of the energy of said acoustic pulses reaches said receiver after passing through said casing while relatively lower amplitude recordings on said second curve represent borehole depths where a substantial portion of the energy of said acoustic pulses is coupled from the casing through the cement into the earth formations, said recording means also including means for providing on said medium an indication from which the depths of the casing collars may be determined.

5. The apparatus defined by claim 4 wherein means are provided for superimposing said casing collar signals upon said electrical signals so that the casing collar indications appear on at least one of said first and second curves.

6. In a system for logging a cased borehole extending into the earth's formations and having cement interposed between the exterior of the casing and the walls of the borehole the combination of a downhole tool within the borehole; a cable having a single inner conductor within an outer sheath and extending from the downhole tool through the borehole to the earth's surface; means at the surface cooperating with the cable to raise and lower the downhole tool within the borehole; and equipment at the surface connected to said cable; said downhole tool comprising a casing collar locator for providing collar locating signals having at least one characteristic affected by the casing collars, a transmitter for repeatedly emitting spaced apart acoustic pulses for transmission through the casing and through the earth formations coupled to the casing via said cement and for producing a synchronizing pulse coincident with each acoustic pulse, a receiver spaced from the transmitter in a direction extending longitudinally of the borehole for detecting said acoustic pulses, an amplifier connected to the output of the receiver for developing electrical signals corresponding to the detected acoustic pulses, means connected to said collar locator for causing said amplifier to develop a characteristic output whenever a casing collar is disposed adjacent the collar locator, means for transmitting to said surface equipment over said single conductor said synchronizing pulses and the output of said amplifier; said surface equipment including means connected to said inner conductor for separating said synchronizing pulses and said electrical signals, recording means including said separating means and responsive to said synchronizing pulses and said electrical signals for developing longitudinally along a recording medium a first curve proportional to the travel time of the acoustic pulses from the transmitter to the receiver at the different borehole depths, additional recording means connected to said inner conductor and responsive to said synchronizing pulses and said electrical signals for developing longitudinally along said medium a second curve proportional to the amplitude of the electrical signals at the different borehole depths simultaneously with the development of the first curve, said first and second curves being displaced transversely of said recording medium and having a common time base so that transversely aligned points on said curves represent a common borehole depth, whereby the acoustic pulses arriving at said receiver after passing through the casing and having an amplitude represented by said second curve can be readily distinguished on said second curve from the acoustic pulses arriving at said receiver after passing through the cement and the earth formations by the differences in travel time indicated on said first curve, the differences in amplitude of the signals recorded on said second curve being indicative of the relative amounts of energy of said acoustic pulses passing through said casing and through the cement and the earth formations so that high amplitude recordings on said second curve represent borehole depths where a large proportion of the energy of said acoustic pulses reaches said receiver after passing through said casing while relatively lower amplitude recordings on said second curve represent borehole depths where a substantial portion of the energy of said acoustic pulses is coupled from the casing through the cement into the earth formations, said characteristic output of said amplifier being effective to develop upon at least one of said curves indications to permit location of the casing collars.

7. In a system for logging a cased borehole extending into the earth's formations and having cement interposed between the exterior of the casing and the walls of the borehole the combination of a downhole tool within the borehole; a cable having a single inner conductor within an outer sheath and extending from the downhole tool through the borehole to the earth's surface; means at the surface cooperating with the cable to raise and lower the downhole tool within the borehole; and equipment at the surface connected to said cable; said downhole tool comprising a casing collar locator for providing collar locating signals having at least one characteristic affected by the casing collars, a transmitter for repeatedly emitting spaced apart acoustic pulses for transmission through the casing and through the earth formations coupled to the casing via said cement and for producing a synchronizing pulse coincident with each acoustic pulse, a receiver spaced from the transmitter in a direction extending longitudinally of the borehole for detecting said acoustic pulses, an amplifier connected to the output of said receiver for developing electrical signals corresponding to the detected acoustic pulses, means connected to said collar locator for causing said amplifier to develop a characteristic output whenever a casing collar is disposed adjacent the collar locator, means for transmitting to said surface equipment over said single conductor said synchronizing pulses and the output of said amplifier; a D.C. power supply in said surface equipment connected to said single conductor to supply power to the downhole tool; said surface equipment including means connected to said inner conductor for separating said synchronizing pulses and said electrical signals, recording means, including said separating means and responsive to said synchronizing pulses and said electrical signals for developing longitudinally along a recording medium a first curve proportional to the travel time of the acoustic pulses from the transmitter to the receiver at the different borehole depths, additional recording means connected to said inner conductor and responsive to said synchronizing pulses and said electrical signals for developing longitudinally along said medium a second curve proportional to the amplitude of the electrical signals at the different borehole depths simultaneously with the development of the first curve, said first and second curves being displaced transversely of said recording medium and having a common time base so that transversely aligned points on said curves represent a common borehole depth, whereby the acoustic pulses arriving at said receiver after passing through the casing and having an amplitude represented by said second curve can be readily distinguished on said second curve from the acoustic pulses arriving at said receiver after passing through the cement and the earth formations by the differences in travel time indicated on said first curve, the differences in amplitude of the signals recorded on said second curve being indicative of the relative amounts of energy of said acoustic pulses passing through said casing and through the cement and the earth formations so that high amplitude recordings on said second curve represent borehole depths where a large proportion of the energy of said acoustic pulses reaches said receiver after passing through said casing while relatively lower amplitude recordings on said second curve represent borehole depths where a substantial portion of the energy of said acoustic pulses is coupled from the casing through the cement into the earth formations, said characteristic output of said amplifier being effective to develop upon at least one of said curves indications to permit location of the casing collars.

References Cited by the Examiner
UNITED STATES PATENTS

| | | | |
|---|---|---|---|
| 2,233,992 | 3/41 | Wyckoff | 340—18 X |
| 2,368,532 | 1/45 | Fearon | 340—18 X |
| 2,554,844 | 5/51 | Swift | 73—152 |
| 2,857,011 | 10/58 | Summers | 181—0.5 |
| 3,019,414 | 1/62 | Peterson | 181—.5 |
| 3,102,992 | 10/63 | Savage et al. | 340—18 |

SAMUEL FEINBERG, *Primary Examiner.*

CHESTER L. JUSTUS, *Examiner.*